(12) United States Patent
Hsu et al.

(10) Patent No.: US 9,830,108 B2
(45) Date of Patent: Nov. 28, 2017

(54) WRITE REDIRECT

(71) Applicant: SANDISK TECHNOLOGIES INC., Plano, TX (US)

(72) Inventors: Jonathan Hsu, Newark, CA (US); Gautam Ashok Dusija, Milpitas, CA (US); Tienchien Kuo, Sunnyvale, CA (US); Daniel Edward Tuers, Kapaa, HI (US)

(73) Assignee: SanDisk Technologies LLC, Plano, TX (US)

( * ) Notice: Subject to any disclaimer, the term of this patent is extended or adjusted under 35 U.S.C. 154(b) by 245 days.

(21) Appl. No.: 14/880,793

(22) Filed: Oct. 12, 2015

(65) Prior Publication Data

US 2017/0102882 A1  Apr. 13, 2017

(51) Int. Cl.
 *G06F 3/06* (2006.01)

(52) U.S. Cl.
 CPC ............ *G06F 3/065* (2013.01); *G06F 3/061* (2013.01); *G06F 3/0679* (2013.01)

(58) Field of Classification Search
 CPC ......... G06F 3/065; G06F 3/061; G06F 3/0679
 USPC .... 711/165, 103, 154, 156, 158; 365/185.33
 See application file for complete search history.

(56) References Cited

U.S. PATENT DOCUMENTS

| | | | | |
|---|---|---|---|---|
| 7,336,516 B2* | 2/2008 | Tran | ................... | G11C 11/5642 365/185.33 |
| 7,957,186 B2* | 6/2011 | Kang | .................. | G11C 11/5642 365/185.03 |
| 8,078,794 B2 | 12/2011 | Lee et al. | | |
| 8,136,014 B2* | 3/2012 | Uchikawa | ........... | G06F 11/1072 365/185.09 |
| 8,717,827 B1* | 5/2014 | Mehnert | ............. | G11C 11/5628 365/185.11 |
| 8,825,941 B2 | 9/2014 | Moshayedi et al. | | |
| 8,854,882 B2* | 10/2014 | Strasser | .............. | G06F 11/1048 365/185.03 |
| 8,873,286 B2* | 10/2014 | Strasser | .............. | G06F 12/0246 365/185.03 |
| 8,966,163 B2* | 2/2015 | Joo | ...................... | G06F 12/0246 365/185.33 |
| 8,977,803 B2 | 3/2015 | Horn et al. | | |
| 8,982,619 B2* | 3/2015 | Strasser | .............. | G06F 12/0246 365/185.03 |

(Continued)

OTHER PUBLICATIONS

Sharma, "System Design for Mainstream TLC SSD Meeting the Performance Challenge," SanDisk Corporation, Flash Memory Summit, Santa Clara, CA, Aug. 2014, 20 pages.

*Primary Examiner* — Stephen Elmore
(74) *Attorney, Agent, or Firm* — Toler Law Group, PC

(57) ABSTRACT

A data storage device includes a memory (including a single level cell (SLC) memory portion and a multilevel cell (MLC) memory portion), a plurality of data latches, and routing circuitry coupled to the plurality of data latches. The routing circuitry is configured to cause write data, received from a controller, to be stored at a data latch of the plurality of data latches. The routing circuitry is further configured to cause the write data to be copied from the data latch to a particular portion of the memory based on receiving a program mode command after the write data is stored at the data latch, where the program mode command indicates the particular portion as one of the SLC memory portion or the MLC memory portion.

20 Claims, 10 Drawing Sheets

(56) References Cited

U.S. PATENT DOCUMENTS

| | | | |
|---|---|---|---|
| 9,063,671 B2* | 6/2015 | Avila | G06F 3/0688 |
| 9,124,300 B2 | 9/2015 | Sharon et al. | |
| 9,251,891 B1* | 2/2016 | Hu | G11C 11/5642 |
| 9,424,930 B2* | 8/2016 | Wood | G11C 11/5628 |
| 9,477,587 B2* | 10/2016 | Wong | G06F 12/0207 |
| 2009/0259799 A1* | 10/2009 | Wong | G06F 12/0207 |
| | | | 711/103 |

* cited by examiner

WRITE REDIRECT

FIELD OF THE DISCLOSURE

The present disclosure is generally related to routing write data to a portion of a memory based on a command that is received after the write data is received.

BACKGROUND

A data storage devices typically includes multiple storage locations, each corresponding to one or more memory cells. For certain types of memory, such as flash memory, each memory cell may operate as a single level cell (SLC) which can store a single bit or may operate as a multilevel cell (MLC) which can store multiple bits. Since an MLC can store multiple bits, it is more memory efficient to store data in the MLC than in an SLC. For example, if the MLC is a triple level cell (TLC), a single TLC can store three bits, whereas a single SLC can only store one bit.

Generally, it is more energy efficient to write all of the bits to be stored in an MLC at the same time (e.g., in a single write operation). To illustrate, all three bits that are to be stored at a TLC may be written at the same time by programming the TLC to a state that represents all three bits. Thus, while a single programming operation may be used to store a word in a word line of SLC memory, a single programming operation may be used to store three words in various logical pages of a word line of a TLC.

A memory controller coupled to the memory may determine whether to store particular data at an SLC memory portion or at an MLC memory portion. For example, data may be buffered at a volatile memory of the memory controller to enable a determination of whether the data is part of a long write (e.g., multiple related words) or a short write (e.g., a single word). When it is not clear to the memory controller whether particular data should be written to the MLC, the memory controller may write the particular data to the SLC and subsequently copy the particular data to the MLC after determining that the particular data should be written to the MLC. Thus, multiple programming operations may be used to store the particular data at the MLC (at least one to write the data to the SLC and another to write the data to the MLC). Additionally, a significant portion of the SLC memory may be used to store data that is to be copied to the MLC. Thus, when the above described process is used, the SLC may be oversized to accommodate data that will eventually be stored at the MLC. Further, volatile memory in the memory controller is expensive. Thus, providing sufficient volatile memory in the memory controller to store data until a determination can be made whether to store the data at the SLC or at the MLC is costly.

DETAILED DESCRIPTION

Particular implementations are described with reference to the drawings. In the description, common features are designated by common reference numbers throughout the drawings. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term).

Figure 1:
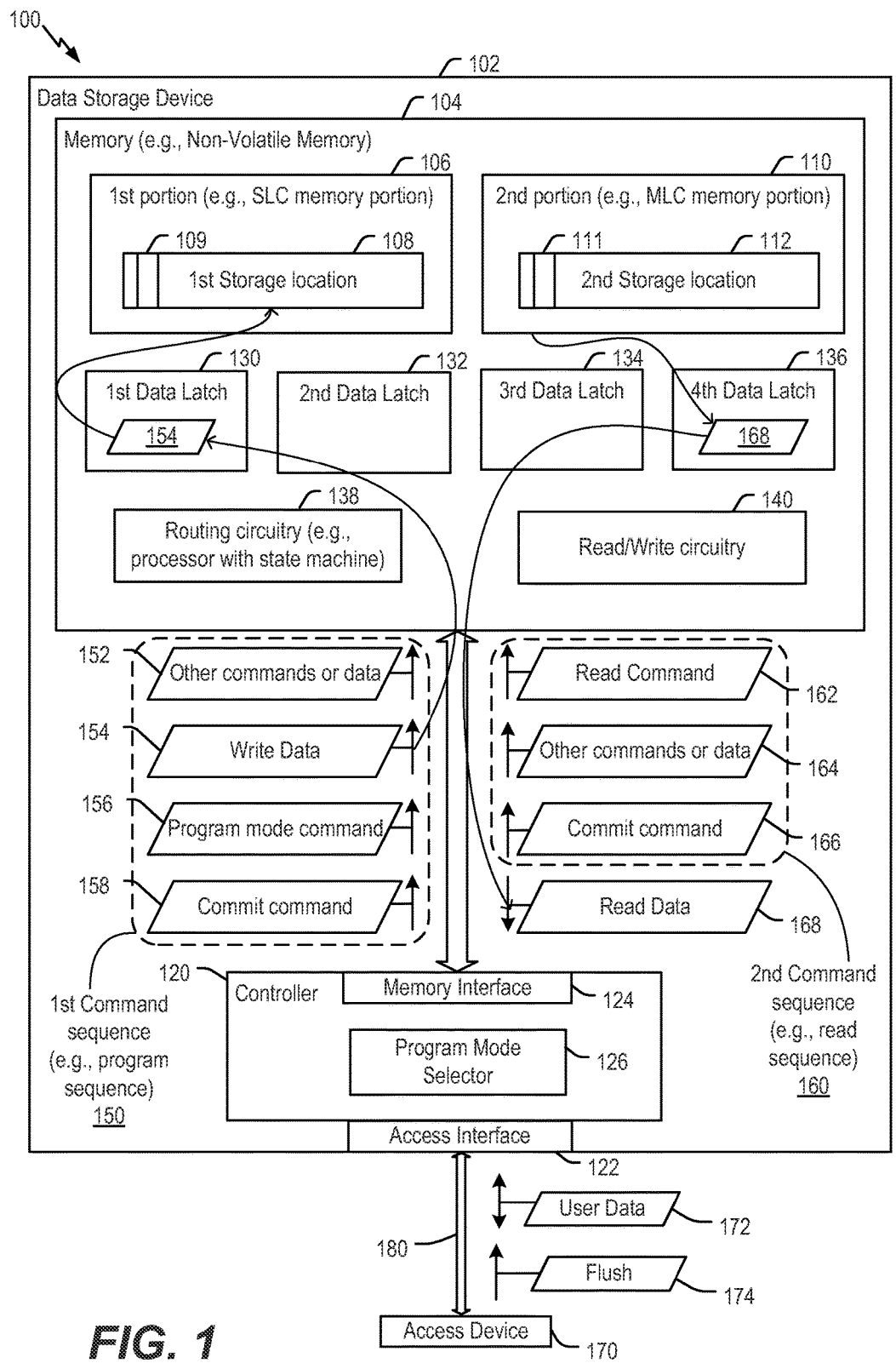
FIG. 1 is a block diagram of a particular example of a system configured to route data to a portion of a memory in a data storage device based on a command that is received after the data is received.

FIG. 1 is a block diagram of a particular example of a system 100 that is configured to route data to a portion of a memory based on a command that is received after the data is received. The system 100 includes a data storage device 102 and an access device 170. In various examples, the access device 170 includes or corresponds to a mobile telephone, a music player, a video player, a gaming console, an electronic book reader, a personal digital assistant (PDA), a computer (such as a laptop computer or notebook computer), a network computer, a server, any other electronic device that hosts or accesses the data storage device 102, or any combination thereof, as illustrative, non-limiting examples The data storage device 102 includes a controller 120 and a memory 104, such as a non-volatile memory, that is coupled to the controller 120. The memory 104 may be divided (e.g., logically or physically partitioned) into multiple distinct portions, such as a first portion 106 and a second portion 110. In particular implementation, the first portion 106 includes a single level cell (SLC) memory portion, and the second portion 110 includes a multilevel cell (MLC) memory portion. For example, the first portion 106 may include a first storage location 108 (e.g., a word line) that includes multiple storage elements or cells (such as a first particular storage element 109), each of which is configured to store a single bit. In this example, the second portion 110 may include a second storage location 112 (e.g., a word line) that includes multiple storage elements or cells (such as a second particular storage element 111), each of which is configured to store multiple bits.

The memory 104 may also include one or more data latches 130-136 and support circuitry, such as routing circuitry 138, read/write circuitry 140, other circuitry, or a combination thereof. As described in more detail below, the routing circuitry 138 may selectively route write data 154 to the first portion 106 of the memory 104 or to the second portion 110 of the memory 104 based on a command that is received at the routing circuitry 138 after the write data 154 is received at the memory 104. For example, the routing circuitry 138 may temporarily store the write data 154 at one of the data latches 130-136, such as at a first data latch 130. After the write data 154 is stored at the first data latch 130, the routing circuitry 138 may receive a program mode command 156 from the controller 120. The program mode command 156 may indicate that the write data 154 is to be stored in the first portion 106 of the memory 104 or may indicate that the write data 154 is to be stored in the second portion 110 of the memory 104. The routing circuitry 138 may cause the write data 154 to be copied from the first data latch 130 to a portion of the memory 104 (e.g., either the first portion 106 or the second portion 110) based on the program mode command 156.

The data storage device 102 and the access device 170 may be operationally coupled via a connection (e.g., a communication path 180), such as a bus or a wireless connection. For example, the data storage device 102 may include an access interface 122 that enables communication via the communication path 180 between the data storage device 102 and the access device 170, such as when the access interface 122 is communicatively coupled to the access device 170. In some implementations, the data storage device 102 may be embedded within the access device 170, such as in accordance with a Joint Electron Devices Engineering Council (JEDEC) Solid State Technology Association Universal Flash Storage (UFS) configuration. Alternatively, the data storage device 102 may be removable from the access device 170 (i.e., "removably" coupled to the access device 170). As an example, the data storage device 102 may be removably coupled to the access device 170 in accordance with a removable universal serial bus (USB) configuration.

In some implementations, the data storage device 102 may include or correspond to a solid state drive (SSD) which may be included in, or distinct from (and accessible to), the access device 170. For example, the data storage device 102 may include or correspond to an SSD, which may be used as an embedded storage drive (e.g., a mobile embedded storage drive), an enterprise storage drive (ESD), a client storage device, or a cloud storage drive, as illustrative, non-limiting examples. In some implementations, the data storage device 102 may be coupled to the access device 170 indirectly, e.g., via a network. For example, the data storage device 102 may be a network-attached storage (NAS) device or a component (e.g., a solid-state drive (SSD) device) of a data center storage system, an enterprise storage system, or a storage area network.

In some implementations, the data storage device 102 may be configured to be coupled to the access device 170 as embedded memory, such as eMMC® (trademark of JEDEC Solid State Technology Association, Arlington, Va.) and eSD, as illustrative examples. To illustrate, the data storage device 102 may correspond to an eMMC (embedded MultiMedia Card) device. As another example, the data storage device 102 may correspond to a memory card, such as a Secure Digital (SD®) card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). The data storage device 102 may operate in compliance with a JEDEC industry specification. For example, the data storage device 102 may operate in compliance with a JEDEC eMMC specification, a JEDEC Universal Flash Storage (UFS) specification, one or more other specifications, or a combination thereof.

In some implementations, the data storage device 102 and the access device 170 may be configured to communicate using one or more protocols, such as an eMMC protocol, a universal flash storage (UFS) protocol, a universal serial bus (USB) protocol, a serial advanced technology attachment (SATA) protocol, and/or another protocol, as illustrative, non-limiting examples. The one or more protocols may include a standardized protocol and/or a non-standardized protocol, such as a proprietary protocol. In some implementations, the data storage device 102 and the access device 170 may be configured to communicate using dual channel communication (e.g., both devices may concurrently issue and receive commands from the other device).

The access device 170 may include a memory interface (not shown) and may be configured to communicate with the data storage device 102 via the memory interface to read data from and write data to the memory 104 of the data storage device 102. For example, the access device 170 may operate in compliance with a Joint Electron Devices Engineering Council (JEDEC) industry specification, such as a Universal Flash Storage (UFS) Access Controller Interface specification. As other examples, the access device 170 may operate in compliance with one or more other specifications, such as a Secure Digital (SD) Access Controller specification, as an illustrative, non-limiting example. The access device 170 may communicate with the memory 104 in accordance with any other suitable communication protocol.

Although not illustrated in FIG. 1, the access device 170 may include a processor and a memory. The memory may be configured to store data and/or instructions that may be executable by the processor. The memory may be a single memory or may include multiple memories, such as one or more non-volatile memories, one or more volatile memories, or a combination thereof. The access device 170 may issue one or more commands to the data storage device 102, such as one or more requests to erase data, read data from, or write data to the memory 104 of the data storage device 102. For example, the access device 170 may be configured to provide data, such as user data 172, to be stored at the memory 104 or to request data to be read from the memory 104.

The memory 104 of the data storage device 102 may include a non-volatile memory. The memory 104 may have a two-dimensional (2D) memory configuration. Alternatively, the memory 104 may have another configuration, such as a three-dimensional (3D) memory configuration. For example, the memory 104 may include a three-dimensional (3D) memory configuration that is monolithically formed in one or more physical levels of arrays of memory cells having an active area disposed above a silicon substrate. Additionally, the memory 104 may include a single memory die or multiple memory dies.

The memory 104 may include support circuitry, such as the routing circuitry 138, the read/write circuitry 140, or a combination thereof. Although depicted in FIG. 1 as a single component, the read/write circuitry 140 may be divided into separate components, such as read circuitry and write circuitry. The read/write circuitry 140 may be external to one or more dies of the memory 104. Alternatively, one or more dies of the memory 104 may include corresponding read/write circuitry that is operable to read data from and/or write data to storage elements within the individual memory die independent of any other read and/or write operations at any of the other memory dies.

Similarly, although depicted in FIG. 1 as a single component, the routing circuitry 138 may include or correspond to multiple components. In a particular implementation, the routing circuitry 138 includes or corresponds to a processor. In this particular implementation, the processor may execute a state machine, or perform operations based on a state machine, to perform operations associated with the routing circuitry 138 in the description below. In other implementations, the routing circuitry 138 may include or correspond to an application specific integrated circuit, a plurality of logic gates, or other components configured to perform the operations associated with the routing circuitry 138 in the description below. The routing circuitry 138 may be external to the one or more dies of the memory 104. Alternatively, one or more dies of the memory 104 may include the routing circuitry 138.

The memory 104 may also include the data latches 130-136. Although four data latches 130-136 are illustrated in FIG. 1, the memory 104 may include more than four data latches or fewer than four data latches. The data latches 130-136 may be used to store write data (e.g., data that is to be written to the first portion 106 or the second portion 110 of the memory 104), read data (e.g., data that is to be read from the first portion 106 or the second portion 110 of the memory 104), or a combination thereof. For example, the routing circuitry 138 may cause the write data 154 to be stored at the first data latch 130 before the write data 154 is stored at the first portion 106 or the second portion 110 of the memory 104. As another example, the read/write circuitry 140 or the routing circuitry 138 may cause read data 168 from the first portion 106 or the second portion 110 of the memory 104 to be stored at a fourth data latch 136 before the read data 168 is provided to the controller 120. The routing circuitry 138 (or the state machine of the routing circuitry 138) may track which data latches 130-136 are occupied (e.g., storing read data or write data). Alternately, the routing circuitry 138 may cause the data latches 130-136 to be accessed in a particular order, such as in a round-robin order, such that data stored at a particular data latch is not overwritten. As a further alternative, the controller 120 may instruct the routing circuitry 138 regarding which of the data latches 130-136 is to be used to store particular data.

The controller 120 is coupled to the memory 104 via a bus, an interface (e.g., interface circuitry, such as a memory interface 124), another structure, or a combination thereof. For example, the bus may include multiple distinct channels to enable the controller 120 to communicate with multiple memory dies of the memory 104 in parallel with, and independently of, communication with the other memory dies of the memory 104. In some implementations, the memory 104 may be a flash memory, as an illustrative, non-limiting example.

In a particular implementation, the controller 120 is configured to receive data, such as the user data 172, and instructions from the access device 170 and to send data to the access device 170. For example, the controller 120 may send data to the access device 170 via the access interface 122, and the controller 120 may receive data from the access device 170 via the access interface 122. The controller 120 is also configured to send data and commands to the memory 104 and to receive data from the memory 104.

For example, the controller 120 may be configured to send the write data 154 to the memory 104 as part of a command sequence, such as the first command sequence 150. In the example illustrated in FIG. 1, a first command sequence 150 is a program sequence. The first command sequence 150 may include the write data 154, a program mode command 156, a commit command 158, other commands or data 152, or a combination thereof. The first command sequence 150 may cause the memory 104 to store the write data 154 to a specified storage location 108, 112 of the memory 104. For example, as illustrated in more detail in FIGS. 2-9, the first command sequence 150 may include an address input that indicates a physical address (e.g., a particular storage location, a storage element or a set of storage elements) of a particular portion (e.g., the first portion 106 or the second portion 110) of the memory 104 that is to store the write data 154.

In the example illustrated in FIG. 1, the controller 120 includes a program mode selector 126. The program mode selector 126 may be configured to determine whether particular write data, such as the write data 154, is to be stored at the first portion 106 (e.g., the SLC memory portion) or is to be stored at the second portion 110 (e.g., the MLC memory portion). The program mode selector 126 may include a processor or special purpose circuitry of the controller 120. For example, the controller 120 may include a processor that executes program code to make routing decisions. The program mode selector 126 may cause short write data to be directed to the first portion 106 (e.g., the SLC memory portion) and may cause long write data to be directed to the second portion 110 (e.g., the MLC memory portion).

To illustrate, the access device 170 may send an indication that particular data to be stored at the memory 104 (e.g., the user data 172) is associated with a long write (e.g., by sending a long write indication or bit with the user data 172). In this instance, the program mode selector 126 may cause the write data 154 associated with the user data 172 to be directed to the second portion 110 (e.g., the MLC memory portion) by generating the program mode command 156 which designates the second portion 110. Alternatively, the access device 170 may send an indication that particular data to be stored at the memory 104 (e.g., the user data 172) is associated with a short write (e.g., by sending a short write indication or bit with the user data 172). In this instance, the program mode selector 126 may cause the write data 154 associated with the user data 172 to be directed to the first portion 106 (e.g., the SLC memory portion) by generating the program mode command 156 which designates the first portion 106.

In another example, the controller 120 may queue write commands before generating command sequences associated with each write command. In this example, the program mode selector 126 may determine whether a set of write commands queued at the controller 120 is related such that data associated with the set of write commands is likely to be accessed together. To illustrate, if the set of write commands include sequential addresses, the program mode selector 126 may determine that data the associated with the set of write commands is likely to be accessed together. If the program mode selector 126 determines that the set of write commands are related, the program mode selector 126 may direct write data associated with each write command of the set of write commands to the second portion 110 (e.g., the MLC portion). Alternately or in addition, if the program mode selector 126 determines that a particular write command is not related to other write commands queued at the controller 120, the program mode selector 126 may direct write data associated with the particular write command to the first portion 106 (e.g., the SLC portion).

In still another example, when the data storage device 102 receives data to be stored in the memory 104 (e.g., the user data 172) from the access device 170, the controller 120 may generate write data (e.g., the write data 154) corresponding to the user data 172. The controller 120 may then send the write data 154 to the memory 104 (e.g., without enqueuing the user data 172, the write data 154, and/or a command associated with the user data 172). The memory 104 may store the write data 154 at one or more of the data latches 130-136. After the write data 154 is stored at one or more of the data latches 130-136, the program mode selector 126 may determine whether the write data 154 should be directed to the first portion 106 or to the second portion 110. In this example, the program mode selector 126 may determine to which portion (e.g., the first portion 106 or the second portion 110) to route the write data 154 based on other write data (not shown) sent to the memory 104. For example, if the program mode selector 126 determines that two or more data latches (such as the first data latch 130 and the second data latch 132) are storing write data that may be accessed together, the program mode selector 126 may cause the write data from the two or more data latches to be directed to the second portion 110 (e.g., the MLC portion).

The portion of the memory 104 (e.g., the first portion 106 or the second portion 110) that is to store the write data 154 may be indicated by the program mode command 156. For example, to designate that the write data 154 is to be programmed to the first portion 106 (e.g., the SLC memory portion), the program mode command 156 may include a first indication (e.g., one or more bits). In another example, to designate that the write data 154 is to be programmed to the second portion 110 (e.g., the MLC memory portion), the program mode command 156 may include a second indication (e.g., one or more bits that are distinct from the one or more bits of the first indication). The routing circuitry 138 may route the write data 154 to the first portion 106 or to the second portion 110 based on the program mode command 156. In a particular implementation, the program mode command 156 may be sent to the memory 104 after the write data 154 is sent to the memory 104. For example, the write data 154 may be received at the memory 104 and stored at one of the data latches 130-136, and, subsequently, the program mode command 156 may be received at the routing circuitry 138.

Thus, a decision as to whether to store the write data 154 at an SLC memory portion (e.g., the first portion 106) or at an MLC memory portion (e.g., the second portion 110) can be deferred without storing the write data 154 temporarily at the SLC memory portion or at a volatile memory of the controller 120. Alternately or in addition, the decision as to whether to store the write data 154 at an SLC memory portion (e.g., the first portion 106) or at an MLC memory portion (e.g., the second portion 110) can be changed after the write data 154 is sent to the memory 104 and stored at one of the data latches 130-136. For example, the other commands or data 152 may include an initial program mode command (not shown in FIG. 1) that indicates that the write data 154 is to be stored at the MLC memory portion; however, subsequently, the controller 120 may have cause to commit all data to the non-volatile memory (e.g., based on a flush command 174) without waiting for other write data to be stored with the write data 154 at the MLC memory portion. In such a circumstance, if the controller 120 has not already sent the commit command 158, the controller 120 may send the program mode command 156 as a second program mode command in the first command sequence 150. The program mode command 156 may indicate that the write data 154 is to be stored at the SLC memory portion. Specific examples of program command sequences and operations performed based on each program command sequence are described in more detail with reference to FIGS. 2-9.

The controller 120 is also configured to cause data (e.g., the read data 168) to be read from a specified address of the memory 104. For example, the controller 120 may be configured to send a read command 162 to the memory 104 as part of a read command sequence. An example of a read command sequence is illustrated in FIG. 1 as a second command sequence 160. As illustrated in more detail in FIGS. 4, 8 and 9, the second command sequence 160 may include an address input indicating a physical address (e.g., a particular storage location, a storage element or a set of storage elements) of a particular portion (e.g., the first portion 106 or the second portion 110) of the memory 104 that stores the read data 168. The second command sequence 160 may also include a commit command 166, other commands or data 164, or a combination thereof.

Although not illustrated in FIG. 1, the controller 120 may include other components, such as a volatile memory (e.g., RAM or cache memory), to store management tables, to cache commands or data, and so forth. As another example, the controller 120 may include an error correction code (ECC) engine. The ECC engine may be configured to receive data, such as the user data 172, and to generate one or more error correction code (ECC) codewords (e.g., including a data portion and a parity portion) based on the data. In this example, the write data 154 may correspond to or include a codeword generated by the ECC engine based on the user data 172. The ECC engine may include a decoder configured to decode the read data 168 received from the memory 104 to detect and correct bit errors that may be present in the read data 168. For example, the ECC engine may correct a number of bit errors up to an error correction capability of an ECC technique used by the ECC engine. The ECC engine may include a Reed-Solomon encoder, a Bose-Chaudhuri-Hocquenghem (BCH) encoder, a low-density parity check (LDPC) encoder, a turbo encoder, an encoder configured to encode the data according to one or more other ECC techniques, or a combination thereof, as illustrative, non-limiting examples.

During operation, the access device 170 may send data, such as the user data 172, to be stored in the data storage device 102. The controller 120 may generate write data, such as the write data 154, based on the user data 172. For example, the controller 120 may perform an ECC operation to generate a codeword based on the user data 172. In this example, the codeword may correspond to the write data 154.

The controller 120 may send a first command sequence 150 including the write data 154 to the memory 104. The memory 104 may store the write data 154 at the first data latch 130. The first command sequence 150 may also include the program mode command 156. The program mode command 156 may be sent after the write data 154 in the first command sequence 150. In some implementations, the first command sequence 150 may also include other commands or data 152 that precede the write data 154 in the first command sequence 150. For example, the first command sequence 150 may include a second program mode command (not shown) that is sent to the memory 104 before the write data 154. In this example, the program mode command 156 may redirect the write data 154. To illustrate, the program mode selector 126 may initially determine to send the write data 154 to the second portion (e.g., the MLC memory portion) based on the access device 170 indicating that the user data 172 is associated with a long write. Based on the initial determination, the controller 120 may send an initial program mode command and the write data 154 to the memory 104. Before sending a commit command (e.g., the commit command 158) to end the first command sequence 150, the controller 120 may receive an indication to commit all write data to the memory 104, such as a flush command 174. Based on the indication to commit all write data to the memory 104, the program mode selector 126 may determine to redirect the write data 154. For example, in the initial program mode command, the program mode selector 126 may have directed the write data 154 to the second portion 110 (e.g., the MLC memory portion); however, the indication to commit all write data to the memory 104 may be received before other data to be written with the write data 154 is received. In this example, the program mode selector 126 may redirect the write data 154 to the first portion 106 (e.g., the SLC memory portion). Thus, the controller 120 may send the program mode command 156 to override the initial program mode command.

In a particular implementation, rather than sending an initial program mode selection, the controller 120 may designate a data latch (e.g., the first data latch 130) to store the write data 154. In this implementation, the controller 120 causes write data, including the write data 154 and possibly other write data (not shown), to be stored at one or more of the data latches 130-136, and the program mode selector 126 determines whether the send the write data to the first portion 106 or the second portion 110 after the data is stored at the one or more of the data latches 130-136. For example, the controller 120 may send the write data 154 to the memory 104 with a command (sent before or after the write data 154) to store the write data a particular data latch, such as the first data latch 130. The program mode selector 126 may determine whether the write data 154 should be written to the first portion 106 or to the second portion 110 of the memory 104 based on whether other write data is stored at other data latches (e.g., at the second data latch 132) that is likely to be accessed with the write data 154. For example, if a set of related write data is stored at the data latches 130-136, the program mode selector 126 may determine to direct the set of related write data to the second portion (e.g., the MLC memory portion). If the write data 154 appears to be unrelated to other write data stored at other data latches, the program mode selector 126 may determine to direct the write data 154 to the first portion (e.g., the SLC memory portion). After the program mode selector 126 determines where to store the write data 154, the controller 120 may send the program mode command 156 indicating particular portion of the memory 104 (e.g., the first portion 106 or the second portion 110) designated to store the write data 154.

The write data 154 may be copied from the first data latch 130 to a particular portion (e.g., the first portion 106 or the second portion 110) after the routing circuitry 138 receives the commit command 158. For example, if the program mode command 156 designates the first portion 106 of the memory 104, the routing circuitry 138 may cause the write data 154 to be copied from the first data latch 130 to the first portion 106 of the memory 104 in response to receiving the commit command 158.

The first command sequence 150 may be interrupted any time before the commit command 158 is received at the memory 104. For example, the access device 170 may send a command (not shown) requesting data from a particular portion of the memory 104. In this example, the controller 120 may send the second command sequence 160 after the first command sequence 150 begins but before the first command sequence 150 ends. The second command sequence 160 may be executed without disrupting the first command sequence 150. For example, the routing circuitry 138 may receive a read command 162 of the second command sequence 160 after the write data 154 is stored at the first data latch 130 and before the write data 154 is copied from the first data latch 130 to the first portion 106 of the memory 104.

Thus, the system 100 enables deferring or changing a decision of whether to store the write data 154 at an SLC memory portion (e.g., the first portion 106) or at an MLC memory portion (e.g., the second portion 110). Since the decision of where to store the write data 154 can be deferred or changed, cache or other volatile memory that would be used by the controller 120 to enqueue commands while determining whether the data should be stored to the MLC memory portion or to the SLC memory portion can be reduced. Providing cache or volatile memory in the controller 120 can be costly, accordingly costs associated with manufacturing the data storage device 102 can be reduced. Additionally, schemes that temporarily store write data at the SLC memory portion and subsequently move the write data to the MLC memory portion are avoided by deferring the decision of where to store the write data. Storing the write data at the SLC memory portion and subsequently moving the write data to the MLC memory portion can reduce a useful lifespan of the memory 104 and cause delays due to moving the data. Accordingly, the system 100 improves durability and reduces latency relative to such schemes.

Figure 2:
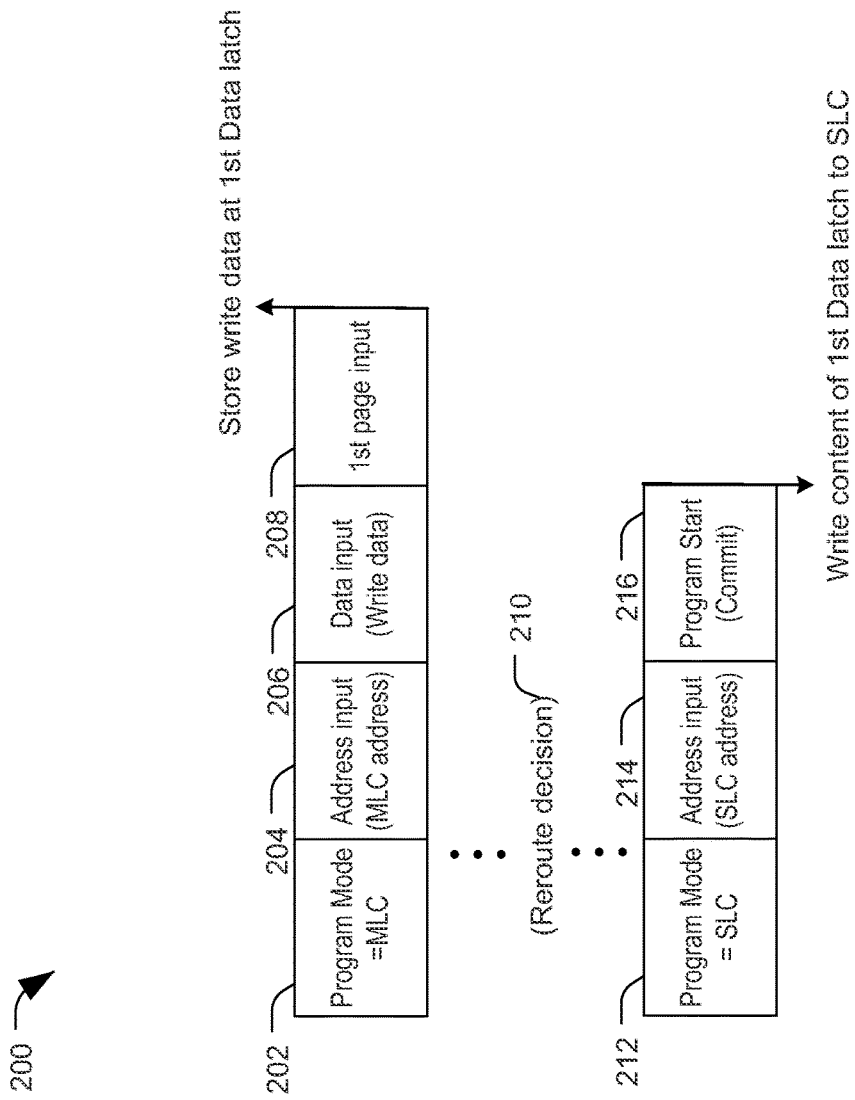
FIG. 2 is a diagram that illustrate a first example of a command sequence and corresponding operations that may be performed at the data storage device of FIG. 1.
Figure 3:
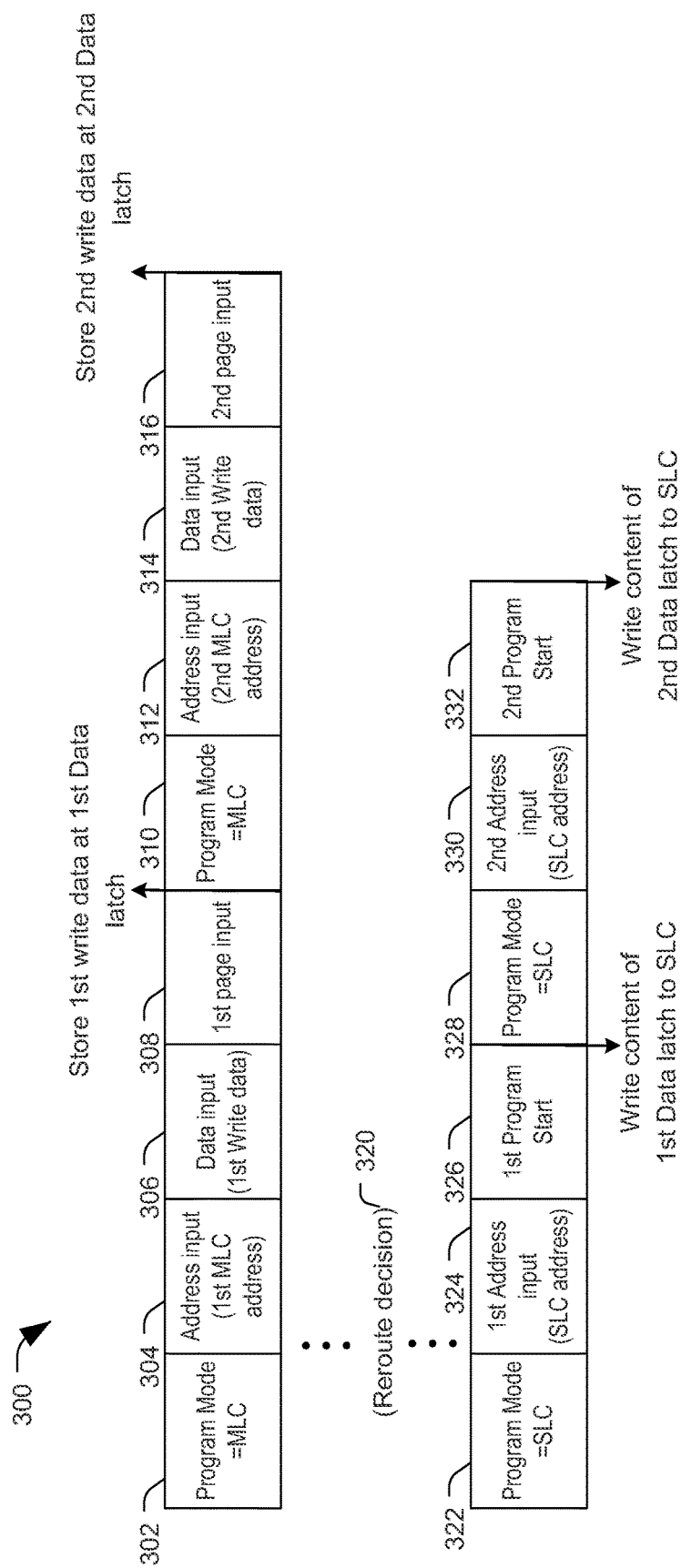
FIG. 3 is a diagram that illustrate a second example of a command sequence and corresponding operations that may be performed at the data storage device of FIG. 1.
Figure 4:
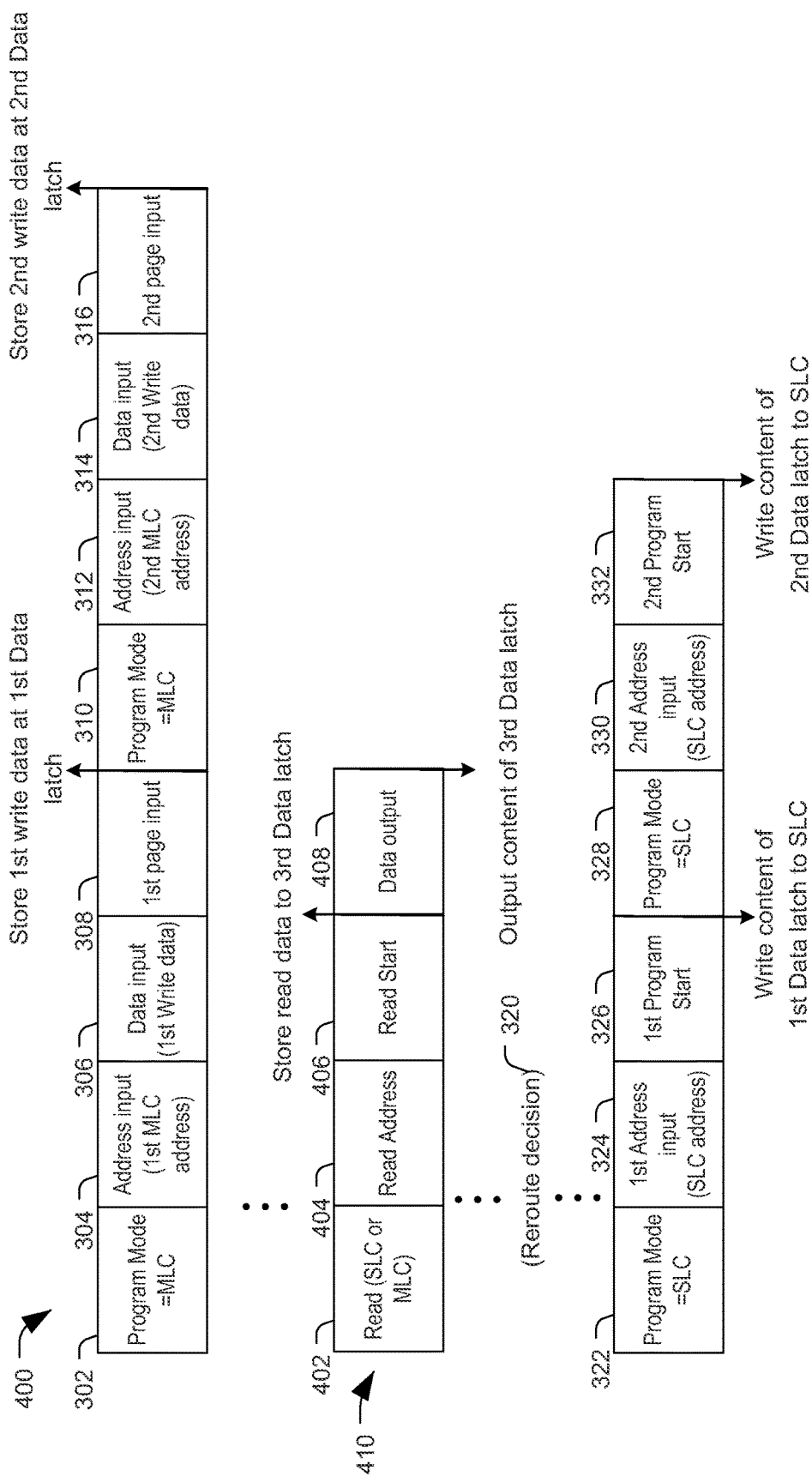
FIG. 4 is a diagram that illustrate a third example of a command sequence and corresponding operations that may be performed at the data storage device of FIG. 1.

FIGS. 2-4 illustrate various examples of command sequences that enable designating an initial route decision, and subsequently (e.g., after write data is stored at a data latch), rerouting the write data to a different portion of the memory. For example, the write data may initially be designated to be written to an MLC portion of the memory. In this example, after the write data is stored at a data latch, a reroute decision may be made to store the write data at an SLC portion of the memory. FIGS. 5-9 illustrate examples of command sequences in which a route decision is postponed until after the write data is stored at the data latch. For example, in FIGS. 5-9, the command sequence does not include a program mode command before the write data is stored at the data latch.

FIG. 2 is a diagram that illustrate a first example of a command sequence 200 and corresponding operations that may be performed at the data storage device 102 of FIG. 1. The command sequence 200 may correspond to or include the first command sequence 150 of FIG. 1. For example, the command sequence 200 may be sent by the controller 120 to the memory 104. In this example, the routing circuitry 138 may perform operations responsive to the command sequence 200.

The command sequence 200 includes a first program mode command 202 indicating that write data associated with the command sequence 200 is to be stored at an MLC memory portion (e.g., the second portion 110 of FIG. 1). The command sequence 200 also includes an address input 204, which identifies a particular storage location of the MLC memory portion, such as the second storage location 112 or the storage element 111 of FIG. 1. The command sequence 200 also includes a data input 206 that includes the write data. For example, the data input 206 may include or correspond to the write data 154. The command sequence 200 may also include a first page input 208. The first page input 208 indicates that the write data is associated with a first page of the particular storage location of the MLC memory portion. For example, when the MLC memory portion is configured as a triple-level cell (TLC) memory portion, a state of each storage element of the TLC memory portion corresponds to three bits of data. Thus, storage location of the TLC memory portion may be divided into three logical pages. In this example, the first page input 208 indicates that the write data is to be stored in a first logical page of the particular storage location of the MLC memory portion.

After the first page input 208 is receive, the routing circuitry 138 may cause the write data to be stored at a data latch (such as the first data latch 130). Subsequently (e.g., after the write data is stored at the data latch), a reroute decision 210 may be made. In FIG. 2, the reroute decision 210 is to store the write data at an SLC memory portion (e.g., the first portion 106 of FIG. 1) rather than at the MLC memory portion (as was indicated in the first program mode command 202). For example, the program mode selector 126 of FIG. 1 may initially determine to direct the write data 154 to the second portion 110 based information indicating that the write data 154 is associated with a long write. However, subsequently, the access device 170 may indicate that all write data is to be committed to the memory 104. For example, the access device 170 may indicate that a power down event is imminent, or may send a command, such as the flush command 174. In this example, the program mode selector 126 directed the write data 154 to the second portion 110 based on an expectation that other write data would be stored with the write data 154 (e.g., in other logical pages) at the second portion 110. However, based on information indicating that other write data will not be stored with the write data 154, the program mode selector 126 may reroute the write data to the first portion 106 (e.g., the SLC memory portion).

After the reroute decision 210, the command sequence 200 includes a second program mode command 212 indicating that the write data is to be stored at the SLC memory portion (e.g., the first portion 106 of FIG. 1). The command sequence 200 also includes a second address input 214, which identifies a particular storage location of the SLC memory portion, such as the first storage location 108 or the storage element 109 of FIG. 1. The command sequence 200 also includes a commit command, such as a program start command 216. The commit command may correspond to the commit command 158 of FIG. 1. In response to the commit command, the routing circuitry 138 may cause the write data to be copied from the data latch to a portion of the memory identified by a most recently received program mode command, e.g., the second program mode command 212 in FIG. 2. Thus, the command sequence 200 causes write data that was initially to be stored at the MLC memory portion (along with other data) to be stored at the SLC memory portion.

FIG. 3 is a diagram that illustrate a second example of a command sequence 300 and corresponding operations that may be performed at the data storage device 102 of FIG. 1. The command sequence 300 may correspond to or include the first command sequence 150 of FIG. 1. For example, the command sequence 300 may be sent by the controller 120 to the memory 104. In this example, the routing circuitry 138 may perform operations responsive to the command sequence 300. While the command sequence 200 of FIG. 2 illustrates a reroute decision after a single page of write data was stored at a data latch of a memory, the command sequence 300 of FIG. 3 illustrates a reroute decision after multiple page of write data are stored at data latches of the memory.

The command sequence 300 includes a first program mode command 302, a first address input 304, a first data input 306 (including first write data), and a first page input 308. The first program mode command 302 indicates that the first write data is to be stored at the MLC memory portion, and the first address input 304 indicates a first MLC address to store the write data. The first page input 308 indicates that the first write data is to be stored at a first logical page of the first MLC address. After receiving the first page input 308, the first write data may be stored at a data latch. For example, the routing circuitry 138 of FIG. 1 may cause the first write data to be stored at the first data latch 130.

The command sequence 300 also includes a second program mode command 310, a second address input 312, a second data input 314 (including second write data), and a second page input 316. In FIG. 3, the second program mode command 310 indicates that the second write data is to be stored at the MLC memory portion, and the second address input 312 indicates a second MLC address to store the write data. The second page input 316 indicates that the second write data is to be stored at a second logical page of the second MLC address. In the example illustrated in FIG. 3, the first MLC address and the second MLC address may be the same. In this example, command sequence 300 indicates that the first write data is to be stored at a first logical page of a particular storage location and the second write data is to be stored at a second logical page of the particular storage location. After receiving the second page input 316, the second write data may be stored at a second data latch. For example, the routing circuitry 138 of FIG. 1 may cause the second write data to be stored at the second data latch 130.

After the first write data is stored at the first data latch and the second write data is stored at the second data latch, a reroute decision 320 may be made. In FIG. 3, the reroute decision 320 is to store the first write data and the second write data at an SLC memory portion (e.g., the first portion 106 of FIG. 1) rather than at the MLC memory portion. For example, the program mode selector 126 of FIG. 1 may initially determine to direct the first and second write data to the second portion 110 of the memory 104 based information indicating that the additional related write data will be received from the access device 170. However, subsequently, the access device 170 may indicate that all write data is to be committed to the memory 104, and, in response, the program mode selector 126 may reroute the first and second write data to the first portion 106 (e.g., the SLC memory portion) of the memory 104.

After the reroute decision 320, the command sequence 300 includes a third program mode command 322 and a third address input 324. The third program mode command 322 may indicate that the first write data is to be directed to the SLC memory portion, and the third address input 324 may indicate a particular storage location of the SLC memory portion to store the first write data. The command sequence 300 may also include a first commit command, such as a first program start command 326. In response to the first commit command, the routing circuitry 138 may cause the first write data to be copied from the first data latch to a portion of the memory identified by a most recently received program mode command, e.g., the third program mode command 322 in FIG. 3. The command sequence 300 also includes a fourth program mode command 328 and a fourth address input 330. The fourth program mode command 328 may indicate that the second write data is to be directed to the SLC memory portion, and the fourth address input 330 may indicate a particular storage location of the SLC memory portion to store the second write data. The command sequence 300 may also include a second commit command, such as a second program start command 332. In response to the second commit command, the routing circuitry 138 may cause the second write data to be copied from the second data latch to a portion of the memory identified by a most recently received program mode command, e.g., the fourth program mode command 328 in FIG. 3. Thus, the command sequence 300 causes write data that was initially indicated to be stored at the MLC memory portion (along with other data) to be stored at the SLC memory portion.

FIG. 4 is a diagram that illustrate a third example of a command sequence 400 and corresponding operations that may be performed at the data storage device 102 of FIG. 1. The command sequence 400 may correspond to or include the first command sequence 150 and the second command sequence 160 of FIG. 1. For example, the command sequence 400 may be sent by the controller 120 to the memory 104. In this example, the routing circuitry 138 may perform operations responsive to the command sequence 400.

In the example illustrated in FIG. 4, the command sequence 300 of FIG. 3 is interrupted by a read command sequence 410. Thus, the command sequence 400 includes each of the commands and corresponding operations described with reference to the command sequence 300 of FIG. 3. In addition, after write data is stored at one or more data latches, the read command sequence 410 is received. The read command sequence 410 includes a read command 402, which may indicate that the SLC memory portion or the MLC memory portion is to be read. The read command sequence 410 may also include a read address input 404 designating a particular storage location to be read. The read command sequence 410 may also include a commit command, such as a read start command 406. In response to the commit command, read data may be read from the particular storage location designated in the read address input 404 and stored at an available data latch. In the example, illustrated in FIG. 4, a first data latch is storing first write data and a second data latch is storing second write data. Accordingly, the read data may be stored at a third data latch. The read data may subsequently be output, at 408, by sending content of the third data latch to the controller 120 of FIG. 1.

After the read data is stored to the third data latch or after the read data is output, the command sequence 300 may resume. For example, the third program mode command 322 may be received. Thus, a read command sequence may interrupt a program command sequence without loss of write data, and without commands associated with the program command sequence being resent by the controller.

Although FIG. 4 illustrates the read command sequence 410 interrupting a program command sequence, e.g., the command sequence 300, after the second write data is stored at the second data latch, in other examples, the read command sequence 410 may interrupt the program command sequence at another location. For example, the read command sequence 410 may interrupt the command sequence 300 between storing the first write data at the first data latch and receiving the second program mode command 310. As another example, the read command sequence 410 may interrupt the command sequence 300 between copying the first write data from the first data latch to the SLC memory portion and receiving the fourth program mode command 328.

Additionally, although the reroute decision 320 in FIG. 4 is illustrated after the read command sequence 410, in other examples, the reroute decision 320 may occur at a different point within the program command sequence. For example, the reroute decision 320 may occur between storing the first write data at the first data latch and receiving the second program mode command 310. As another example, the reroute decision 320 may occur before the read command sequence 410. As yet another example, the reroute decision 320 may occur concurrently with execution of the read command sequence 410. Thus, the command sequence 400 causes write data that was initially designated to be stored at the MLC memory portion (along with other data) to be stored at the SLC memory portion and can be interrupted by another command sequence, such as the read command sequence 410.

Figure 5:
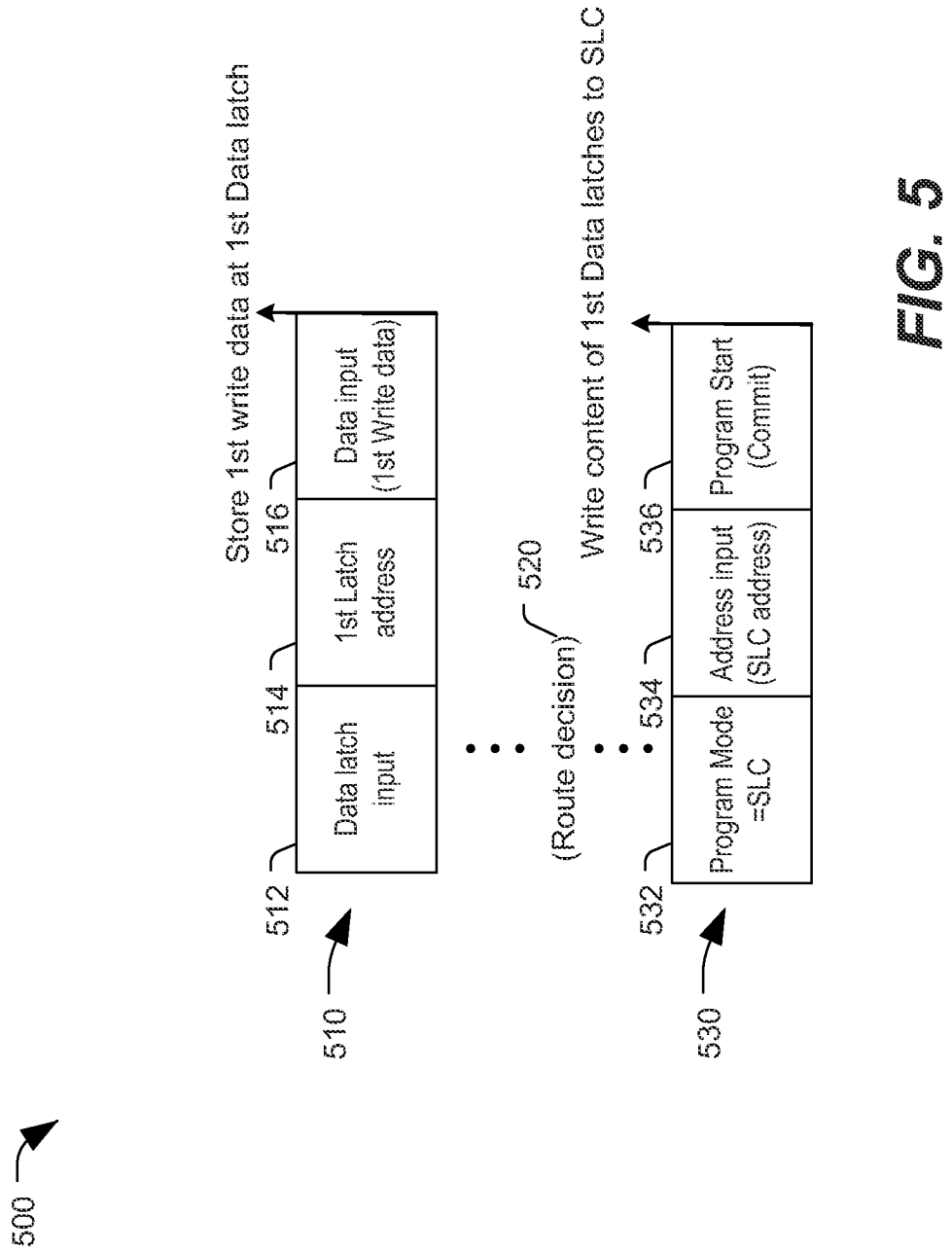
FIG. 5 is a diagram that illustrate a fourth example of a command sequence and corresponding operations that may be performed at the data storage device of FIG. 1.

FIG. 5 is a diagram that illustrate a fourth example of a command sequence 500 and corresponding operations that may be performed at the data storage device 102 of FIG. 1. The command sequence 500 may correspond to or include the first command sequence 150 of FIG. 1. For example, the command sequence 500 may be sent by the controller 120 to the memory 104. In this example, the routing circuitry 138 may perform operations responsive to the command sequence 500. As explained above, while FIGS. 2-4 illustrate examples of command sequences that include reroute decisions, FIGS. 5-9 illustrate examples of command sequences with deferred route decisions.

The command sequence 500 includes a first set of commands 510 to program first write data to a first data latch. For example, the first set of commands 510 includes a data latch input 512 (also referred to as a data latch input mode command) and a first latch address 514 (e.g., a first data latch address). The data latch input 512 indicates to the routing circuitry 138 that the first set of commands 510 relates to storing write data at a data latch (e.g., that the write data is to be stored at the data latch pending receipt of the first program mode command), and the first latch address 514 specifies a particular data latch (e.g., the first data latch 130 of FIG. 1) in which the write data is to be stored. The first set of commands 510 also includes a first data input 516 that includes first write data (e.g., the write data 154 of FIG. 1). In response to the first set of commands 510, the routing circuitry 138 may cause the first write data to be stored at the first data latch specified by the first latch address 514.

After the first write data is stored at the first data latch, a route decision 520 may be made. For example, the program mode selector 126 of FIG. 1 may determine to store the first write data at an SLC memory portion (e.g., the first portion 106) or at an MLC memory portion (e.g., the second portion 110). Based on the route decision 520, the controller 120 may send a second set of commands 530 to the memory 104. The second set of commands 530 relate to routing data stored at the first data latch to a particular portion of the memory 104. In the particular example illustrated in FIG. 5, the second set of commands 530 includes a program mode command 532 and an address input 534. The program mode command 532 indicates the particular portion of the memory 104 (e.g., the first portion 106 or the second portion 110) to which the first write data is directed, and the address input 534 specifies a particular storage location (such as the first storage location 108 or the second storage location 112) at which the first write data is to be stored. The second set of commands 530 also includes a commit command, such as a program start command 536. In response to the second set of commands 530, the routing circuitry 138 may cause the cause the first write data to be copied from the first data latch to the particular storage location (as indicated by the address input 534) of the particular portion (as indicated by the program mode command 532) of the memory 104.

Thus, the command sequence 500 allows the controller 120 (or the program mode selector 126) to delay making the route decision until after write data is sent to the memory 104 and stored at a data latch. Delaying making the route decision may enable the controller 120 to send the write data to the memory 104 without caching or queuing the write data (or associated write commands) at the controller 120 until the route decision is made. Additionally, the command sequence 500 delays making the route decision without initially storing the write data at the SLC memory portion and subsequently copying the write data to the MLC memory portion.

Figure 6:
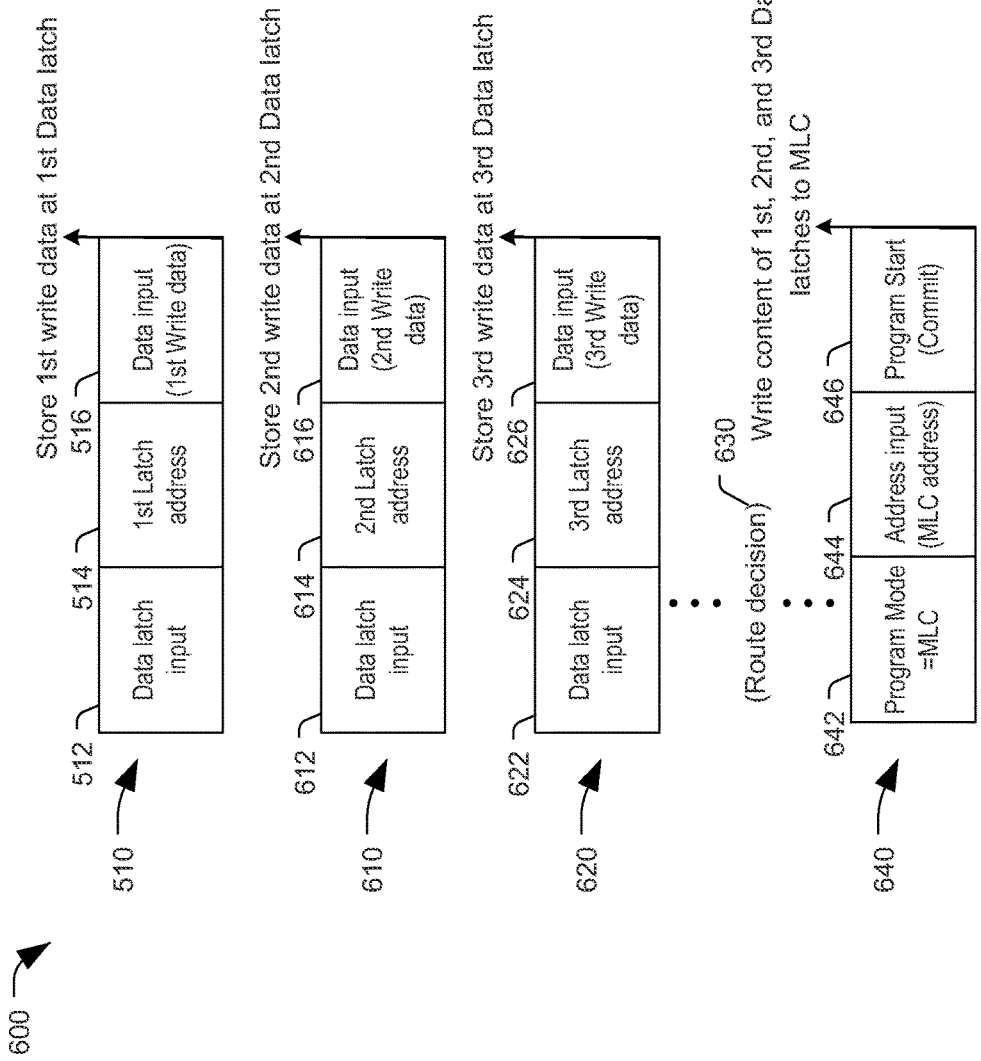
FIG. 6 is a diagram that illustrate a fifth example of a command sequence and corresponding operations that may be performed at the data storage device of FIG. 1.

FIG. 6 is a diagram that illustrate a fifth example of a command sequence 600 and corresponding operations that may be performed at the data storage device 102 of FIG. 1. The command sequence 600 may correspond to or include the first command sequence 150 of FIG. 1. For example, the command sequence 600 may be sent by the controller 120 to the memory 104. In this example, the routing circuitry 138 may perform operations responsive to the command sequence 600.

The command sequence 600 includes the first set of commands 510 of FIG. 5. For example, the command sequence 600 includes the first data latch input 512, the first latch address 514, and the first data input 516. In response to the first set of commands 510, the routing circuitry 138 may cause the first write data to be stored at the first data latch, as specified by the first latch address 514.

The command sequence 600 also includes one or more additional sets of commands related to storing write data at data latches. For example, the command sequence 600 includes a second set of commands 610, which includes a second data latch input 612, a second latch address 614, and a second data input 616 including second write data. In response to the second set of commands 610, the routing circuitry 138 may cause the second write data to be stored at the second data latch, as specified by the second latch address 614. The command sequence 600 also includes a third set of commands 620, which includes a third data latch input 622, a third latch address 624, and a third data input 626 including third write data. In response to the third set of commands 620, the routing circuitry 138 may cause the third write data to be stored at the third data latch, as specified by the third latch address 624. Although the command sequence 600 includes three set of commands (e.g., the first set of commands 510, the second set of commands 620, and the third set of commands 630) relating to three sets of write data (e.g., the first write data, the second write data, and the third write data), in other examples, a command sequence may include more than three or fewer than three sets of commands relating to more than three or fewer than three sets of write data. For example, a number of sets of command and write data may depend on a number of data latches of the memory.

After write data (e.g., the first write data, the second write data, and the third write data in the example illustrated in FIG. 6) is stored at one or more data latches of the memory, the controller 120 (or the program mode selector 126) may make a route decision 630. For example, the program mode selector 126 of FIG. 1 may determine to store the write data at an SLC memory portion (e.g., the first portion 106) or at an MLC memory portion (e.g., the second portion 110). Based on the route decision 630, the controller 120 may send a fourth set of commands 640 to the memory 104. The fourth set of commands 640 relate to routing data stored at the data latches to particular portions of the memory 104. The fourth set of commands 640 includes a program mode command 642 and an address input 644. The program mode command 642 indicates a particular portion of the memory 104 (e.g., the first portion 106 or the second portion 110) to which the write data is directed, and the address input 644 specifies a particular storage location (such as the first storage location 108 or the second storage location 112) at which the write data is to be stored.

Figure 7:
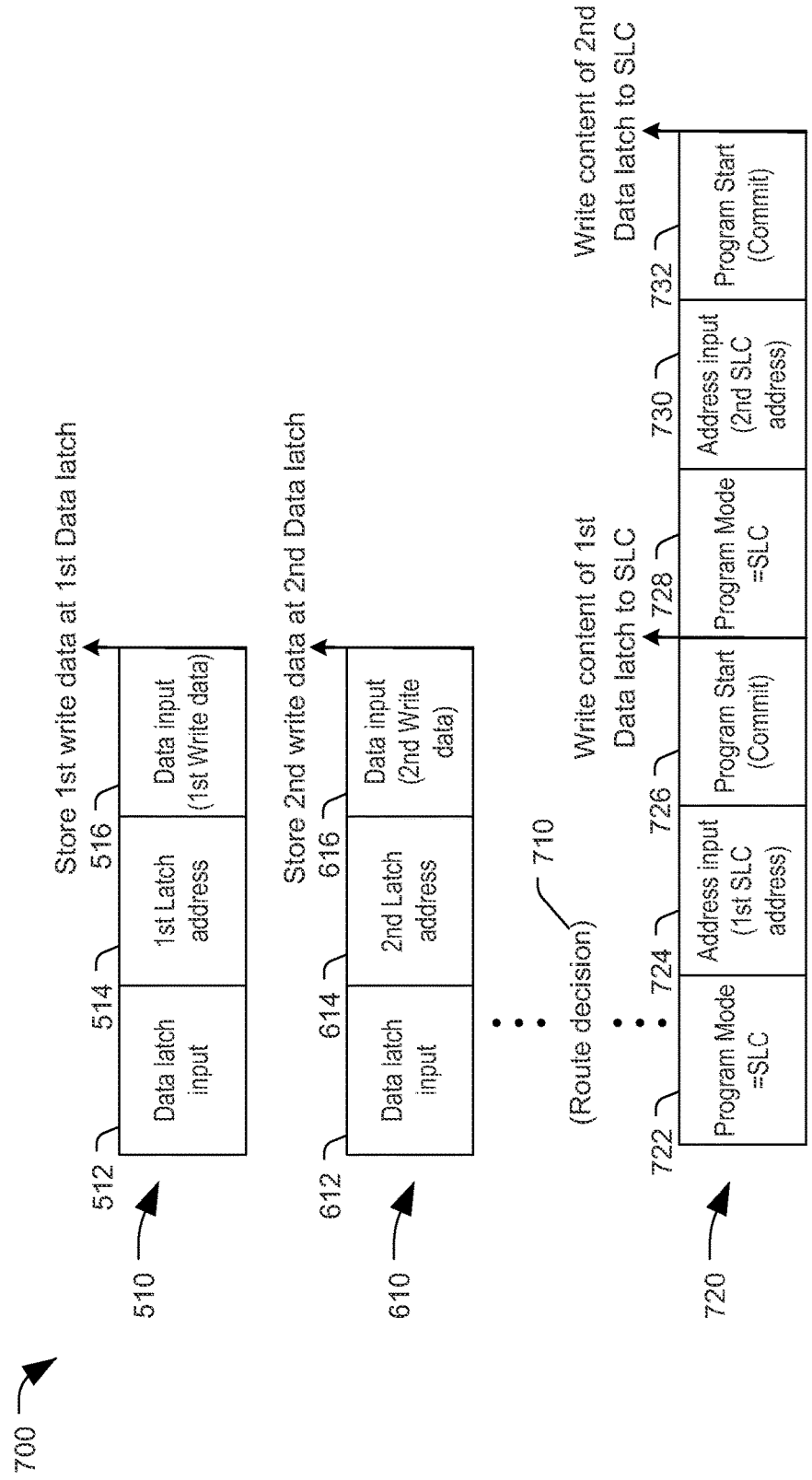
FIG. 7 is a diagram that illustrate a sixth example of a command sequence and corresponding operations that may be performed at the data storage device of FIG. 1.

In the particular example illustrated in FIG. 6, the route decision 630 is to direct all of the write data stored at the data latches (e.g., the first write data, the second write data, and the third write data) to the MLC memory portion. For example, each storage location of the MLC memory portion may be configured to store three logical pages of data (e.g., that the MLC memory portion is a TLC memory portion). Thus, the three sets of write data stored at the data latches can be stored in distinct logical pages of a single storage location. Accordingly, only one address input 644 is used to specify storage locations for all three sets of write data. FIG. 7 illustrates an example in which multiple address inputs are used to specify storage locations of write data stored at the data latches.

The fourth set of commands 640 also includes a commit command, such as a program start command 646. In response to the fourth set of commands 640, the routing circuitry 138 may cause the cause the first write data to be copied from the first data latch to a first logical page of the particular storage location, cause the second write data to be copied from the second data latch to a second logical page of the particular storage location, and cause the third write data to be copied from the third data latch to a third logical page of the particular storage location.

Thus, the command sequence 600 allows the controller 120 (or the program mode selector 126) to delay making the route decision until after the write data is sent to the memory 104 and stored at one or more data latches. Delaying making the route decision may enable the controller 120 to send write data to the memory 104 without caching or queuing the write data (or associated write commands) at the controller 120 until the route decision is made. Additionally, the command sequence 600 delays making the route decision without initially storing the write data at the SLC memory portion and subsequently copying the write data to the MLC memory portion.

FIG. 7 is a diagram that illustrate a sixth example of a command sequence 700 and corresponding operations that may be performed at the data storage device 102 of FIG. 1. The command sequence 700 may correspond to or include the first command sequence 150 of FIG. 1. For example, the command sequence 700 may be sent by the controller 120 to the memory 104. In this example, the routing circuitry 138 may perform operations responsive to the command sequence 700. As explained above, the command sequence 700 includes multiple address inputs to specify storage locations of write data stored at the data latches.

The command sequence 700 includes the first set of commands 510 of FIGS. 5 and 6. For example, the command sequence 700 includes the first data latch input 512, the first latch address 514, and the first data input 516. In response to the first set of commands 510, the routing circuitry 138 may cause the first write data to be stored at the first data latch, as specified by the first latch address 514.

The command sequence 700 also includes the second set of commands 610 of FIG. 6. For example, the command sequence 700 includes the second data latch input 612, the second latch address 614, and the second data input 616. In response to the second set of commands 610, the routing circuitry 138 may cause the second write data to be stored at the second data latch, as specified by the second latch address 614.

After write data (e.g., the first write data and the second write data in the example illustrated in FIG. 7) is stored at one or more data latches of the memory, the controller 120 (or the program mode selector 126) may make a route decision 710. For example, the program mode selector 126 of FIG. 1 may determine to store the first write data and the second write data at an SLC memory portion (e.g., the first portion 106) or at an MLC memory portion (e.g., the second portion 110). Based on the route decision 710, the controller 120 may send a third set of commands 720 to the memory 104. The third set of commands 720 relates to routing data stored at the data latches to particular portions of the memory 104.

In the particular example illustrated in FIG. 7, the route decision 710 is to direct the write data stored at the data latches (e.g., the first write data and the second write data) to the SLC memory portion. Since each storage location of the SLC memory portion can store a single set of write data and the data latches include two sets of write data (e.g., the first write data and the second write data), the third set of commands 720 includes separate commands related to each of the sets of write data stored in the data latches. For example, the third set of commands 720 includes a first program mode command 722 and a first address input 724. The first program mode command 722 indicates a particular portion of the memory 104 (e.g., the first portion 106 or the second portion 110) to which the first write data is directed, and the first address input 724 specifies a first storage location for the first write data. The third set of commands 720 also includes a first commit command, such as a first program start command 726. In response to the first commit command, the routing circuitry 138 may cause the cause the first write data to be copied from the first data latch to the first storage location.

The third set of commands 720 also includes a second program mode command 728 and a second address input 730. The second program mode command 728 indicates a particular portion of the memory 104 (e.g., the first portion 106 or the second portion 110) to which the second write data is directed, and the second address input 730 specifies a second storage location for the second write data. The third set of commands 720 also includes a second commit command, such as a second program start command 732. In response to the second commit command, the routing circuitry 138 may cause the cause the second write data to be copied from the second data latch to the second storage location.

Thus, the command sequence 700 allows the controller 120 (or the program mode selector 126) to delay making the route decision until after write data is sent to the memory 104 and stored at one or more data latches. Delaying making the route decision may enable the controller 120 to send write data to the memory 104 without caching or queuing the write data (or associated write commands) at the controller 120 until the route decision is made. Additionally, the command sequence 700 delays making the routs decision without initially storing the write data at the SLC memory portion and subsequently copying the write data to the MLC memory portion.

Figure 8:
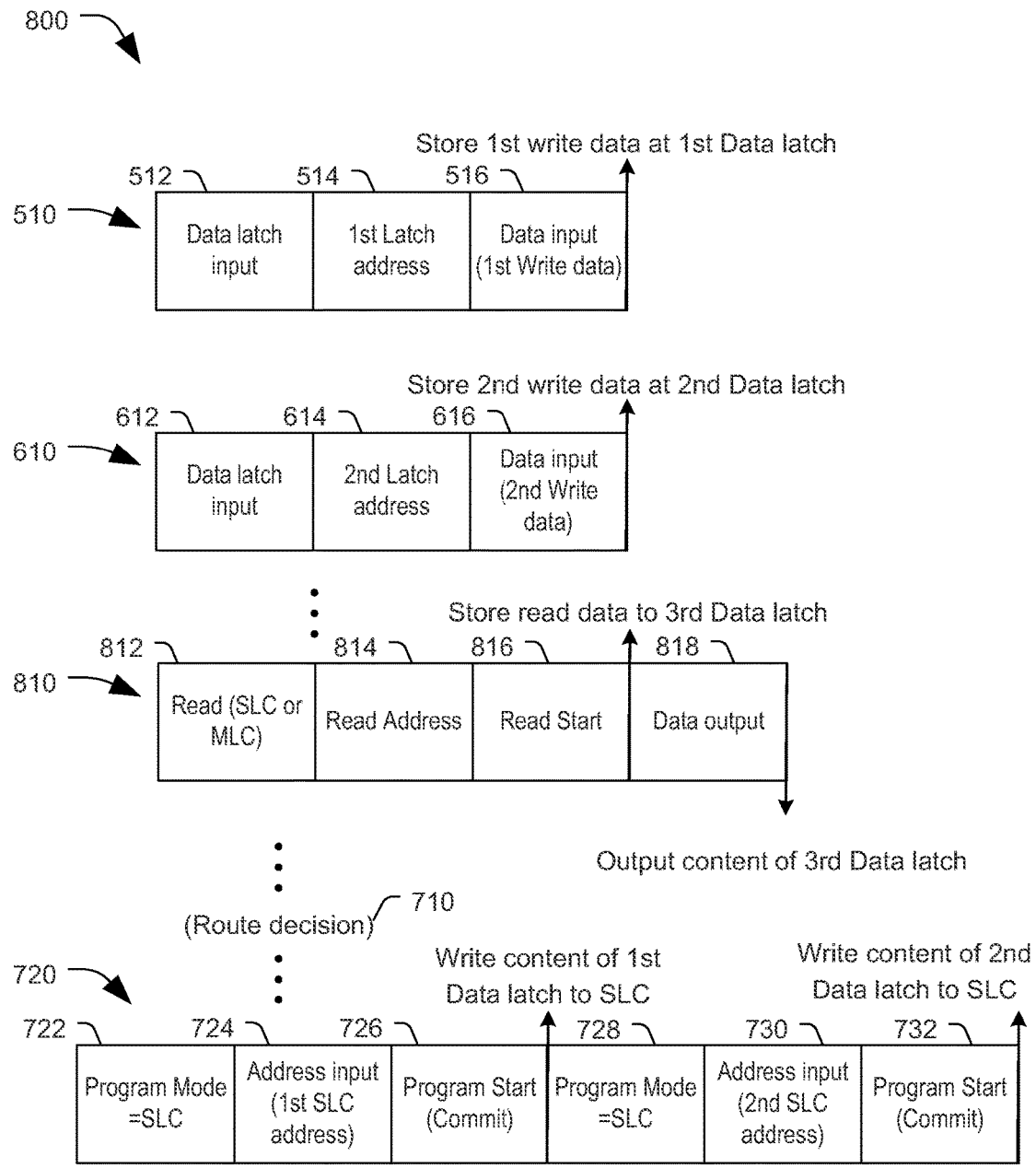
FIG. 8 is a diagram that illustrate a seventh example of a command sequence and corresponding operations that may be performed at the data storage device of FIG. 1.

FIG. 8 is a diagram that illustrate a seventh example of a command sequence 800 and corresponding operations that may be performed at the data storage device 102 of FIG. 1. The command sequence 800 may correspond to or include the first command sequence 150 and the second command sequence 160 of FIG. 1. For example, the command sequence 800 may be sent by the controller 120 to the memory 104. In this example, the routing circuitry 138 may perform operations responsive to the command sequence 800. In the example illustrated in FIG. 8, a program command sequence is interrupted by a read command sequence 810. In particular in FIG. 8, the command sequence 700 of FIG. 7 is interrupted by the read command sequence 810. Thus, the command sequence 800 of FIG. 8 includes each of the commands and operations illustrated and described with reference to the command sequence 700 of FIG. 7.

In the command sequence 800, after the first write data is stored at the first data latch and the second write data is stored at the second data latch, the read command sequence 810 is received. The read command sequence 810 includes a read command 812. The read command 812 may indicate that the SLC memory portion or the MLC memory portion is to be read. The read command sequence 810 may also include a read address input 814 designating a particular storage location to be read. The read command sequence 810 may also include a commit command, such as a read start command 816. In response to the commit command, data may be read from the particular storage location designated in the read address input 814 and stored at an available data latch. In the example, illustrated in FIG. 8, the first data latch is storing the first write data and the second data latch is storing the second write data. Accordingly, the data read from the particular storage location may be stored at a third data latch. The data may subsequently be output, at 818, by sending content of the third data latch to the controller 120 of FIG. 1 as read data.

After the read command sequence 810 is executed, the command sequence 800 may continue as described with respect to the command sequence 700 of FIG. 7. Although only one read command sequence 810 is shown interrupting the program command sequence (e.g., the command sequence 700), in other examples, more than one read command sequence 810 may interrupt the program command sequence. Additionally, although the read command sequence 810 is shown interrupting the program command sequence after write data is stored at two data latches, in other examples, the read command sequence 810 may interrupt the program command sequence at another point. For example, the read command sequence 810 may be received and executed after a first set of commands 510 is receive and before the second set of commands 610 is received. As another example, the read command sequence 810 may be received and executed after a first commit command, such as the first program start command 726, is received and before the second program mode command 728 is received.

Thus, the command sequence 800 allows the controller 120 (or the program mode selector 126) to delay making the route decision until after write data is sent to the memory 104 and stored at one or more data latches. Additionally, the command sequence 800 shows that a program command sequence can be interrupted by one or more read command sequences without causing loss of data.

Figure 9:
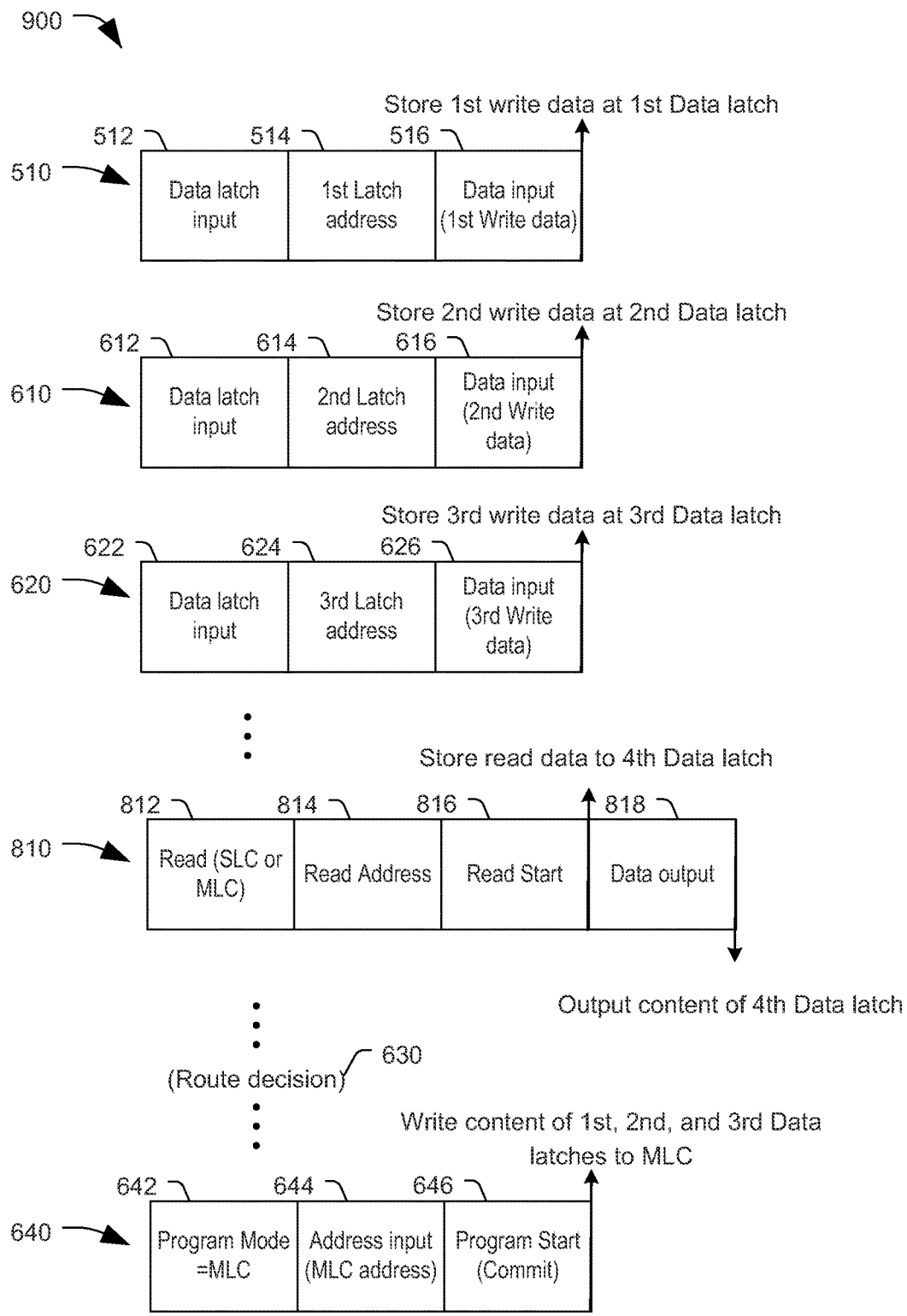
FIG. 9 is a diagram that illustrate an eighth example of a command sequence and corresponding operations that may be performed at the data storage device of FIG. 1.

FIG. 9 is a diagram that illustrate a eighth example of a command sequence 900 and corresponding operations that may be performed at the data storage device 102 of FIG. 1. The command sequence 900 may correspond to or include the first command sequence 150 and the second command sequence 160 of FIG. 1. For example, the command sequence 900 may be sent by the controller 120 to the memory 104. In this example, the routing circuitry 138 may perform operations responsive to the command sequence 900. In the example illustrated in FIG. 9, a program command sequence is interrupted by the read command sequence 810. In particular in FIG. 9, the command sequence 600 of FIG. 6 is interrupted by the read command sequence 810. Thus, the command sequence 900 of FIG. 9 includes each of the commands and operations illustrated and described with reference to the command sequence 600 of FIG. 6.

In the command sequence 900, after the first write data is stored at the first data latch, the second write data is stored at the second data latch, and the third write data is stored at the third data latch, the read command sequence 810 is received. The read command sequence 810 includes the read command 812, the read address input 814, and the read start command 816. In response to the read start command 816, data may be read from the particular storage location designated in the read address input 814 and stored at an available data latch. In the example, illustrated in FIG. 8, the first data latch is storing the first write data, the second data latch is storing the second write data, and the third data latch is storing the third write data. Accordingly, the data read from the particular storage location may be stored at a fourth data latch. The data may subsequently be output, at 408, by sending content of the fourth data latch to the controller 120 of FIG. 1 as read data.

After the read command sequence 810 is executed, the program command sequence (e.g., the command sequence 600 of FIG. 6) of the command sequence 900 may continue as described with reference to the command sequence 600 of FIG. 6. Although only one read command sequence 810 is shown interrupting the program command sequence (e.g., the command sequence 600), in other examples, more than one read command sequence 810 may interrupt the program command sequence. Additionally, although the read command sequence 810 is shown interrupting the program command sequence after write data is stored at three data latches, in other examples, the read command sequence 810 may interrupt the program command sequence at another point.

Thus, the command sequence 900 allows the controller 120 (or the program mode selector 126) to delay making the route decision until after write data is sent to the memory 104 and stored at one or more data latches. Additionally, the command sequence 900 shows that a program command sequence can be interrupted by one or more read command sequences without causing loss of data.

Figure 10:
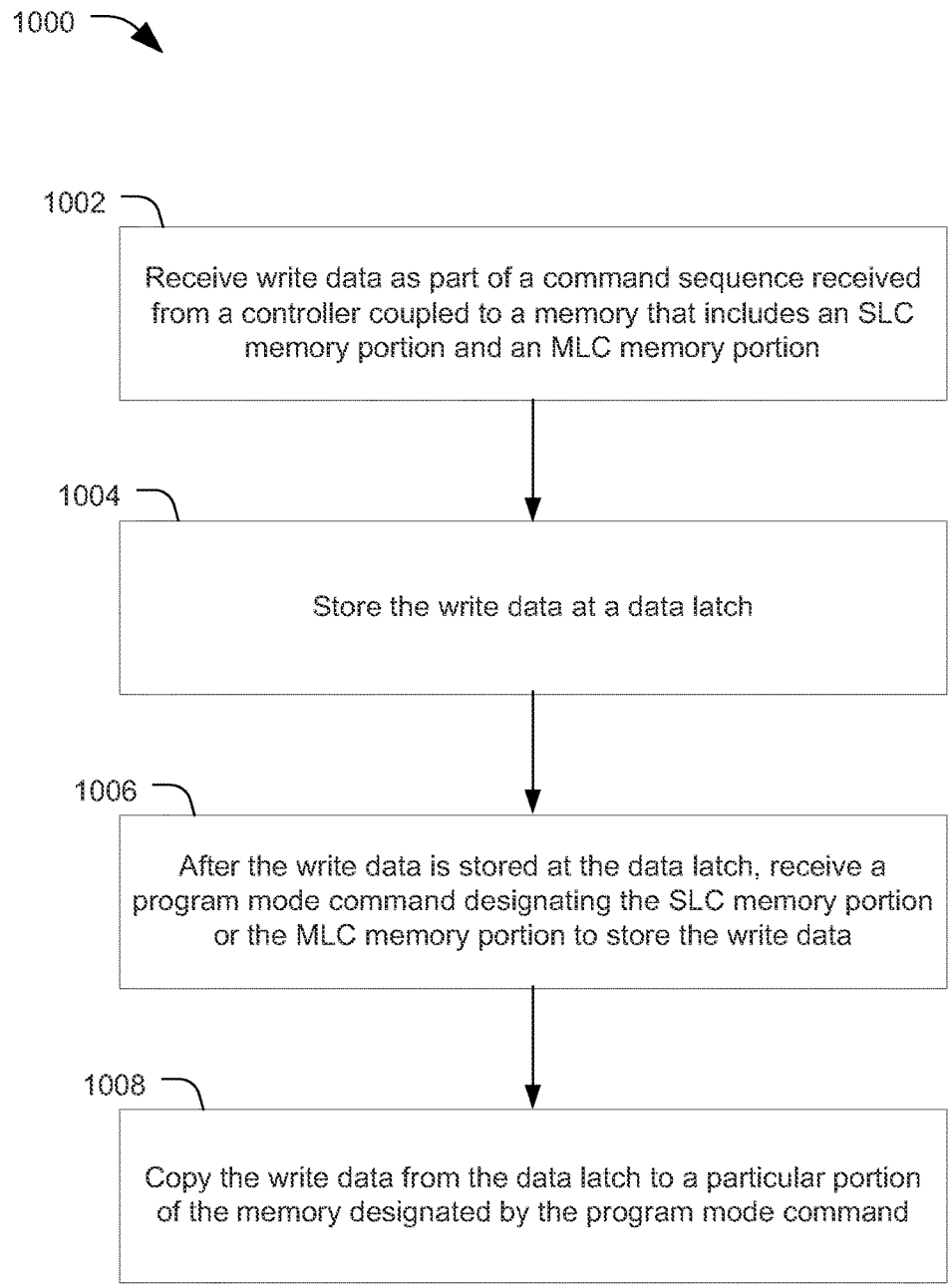
FIG. 10 is a flow diagram that illustrates a particular example of a method of operation of the data storage device of FIG. 1.

FIG. 10 is a flow diagram that illustrates a particular example of a method 1000 of operation of the data storage device of FIG. 1. For example, the method 1000 may be performed at a data storage device that includes routing circuitry and a memory that includes a single level cell (SLC) memory portion and a multilevel cell (MLC) memory portion. FIGS. 2-9 illustrate various examples of program command sequences and operations that may correspond the method 1000.

The method 1000 includes, at 1002, receiving write data as part of a command sequence (e.g., a program command sequence) received from a controller coupled to the memory. For example, the write data 154 of FIG. 1 may be received at the memory 104 as part of the first command sequence 150. The method 1000 includes, at 1004, storing the write data at a data latch. For example, the write data 154 of FIG. 1 may be stored at the first data latch 130.

After the write data is stored at the data latch, the method 1000 includes, at 1006, receiving a program mode command designating the SLC memory portion or the MLC memory portion to store the write data. For example, the program mode command 156 of FIG. 1 may be received at the memory 104 after the write data 154 is stored at the first data latch 130. The method 1000 also includes, at 1008, copying the write data from the data latch to a particular portion of the memory designated by the program mode command. Although not illustrated in FIG. 10, the method 1000 may also include, after the write data is stored at the data latch, receiving address data identifying a particular storage element within the particular portion. In this example, the write data is copied to the particular storage element within the particular portion. For example, the routing circuitry 138 of FIG. 1 may cause the write data 154 to be copied from the first data latch 130 to the first storage location 108 of the first portion 106 of the memory 104 based on the first command sequence 150.

In a particular implementation, the method 1000 may also include a read command sequence that interrupts a program command sequence. For example, the method 1000 may include receiving a read command after the write data is stored at the data latch and before the write data is copied from the data latch to the particular portion of the memory. In this example, the method 1000 may also include executing the read command before coping the write data from the data latch to the particular portion of the memory.

Thus, the method 1000 enables a data storage device to delay making a route decision until after write data is sent to a memory and stored at one or more data latches. Delaying making the route decision may reduce caching or queuing of write data (or associated write commands) at a controller of the data storage device while the route decision is made. Alternately, the method 1000 enables modifying a route decision (e.g., making a reroute decision) after the write data is sent to a memory and stored at one or more data latches. Further, the method 1000 allows a program command sequence to be interrupted (e.g., by a read command sequence) without loss of the write data.

The method 1000 of FIG. 10 or one or more of the command sequences and operations of FIGS. 2-9 may be initiated or controlled by an application-specific integrated circuit (ASIC), a processing unit, such as a central processing unit (CPU), a controller, another hardware device, a firmware device, a field-programmable gate array (FPGA) device, or any combination thereof. As an example, the method 1000 of FIG. 10 or one or more of the command sequences and operations of FIGS. 2-9 can be initiated or controlled by one or more processors, such as one or more processors included in or coupled to the controller 120 or the memory 104 of the data storage device 102 and/or the access device 170 of FIG. 1. Additionally, one or more operations described with reference to the FIGS. 2-9 may be optional, may be performed at least partially concurrently, and/or may be performed in a different order than shown or described.

Although various components of the data storage device 102 and/or the access device 170 of FIG. 1 are depicted herein as block components and described in general terms, such components may include one or more microprocessors, state machines, or other circuits configured to enable the various components to perform operations described herein. One or more aspects of the various components may be implemented using a microprocessor or microcontroller programmed to perform operations described herein, such as one or more operations of the method 1000 of FIG. 10 or one or more of the command sequences and operations of FIGS. 2-9. In a particular implementation, each of the controller 120, the memory 104, and/or the access device 170 of FIG. 1 includes a processor executing instructions that are stored at a memory, such as a non-volatile memory of the data storage device 102 or the access device 170 of FIG. 1. Alternatively or additionally, executable instructions that are executed by the processor may be stored at a separate memory location that is not part of the non-volatile memory, such as at a read-only memory (ROM) of the data storage device 102 or the access device 170 of FIG. 1.

With reference to FIG. 1, the data storage device 102 may be attached to or embedded within one or more access devices, such as within a housing of a communication device (e.g., the access device 170). For example, the data storage device 102 may be integrated within an apparatus, such as a mobile telephone, a computer (e.g., a laptop, a tablet, or a notebook computer), a music player, a video player, a gaming device or console, an electronic book reader, a personal digital assistant (PDA), a portable navigation device, or other device that uses non-volatile memory. However, in other implementations, the data storage device 102 may be implemented in a portable device configured to be selectively coupled to one or more external access devices. In still other implementations, the data storage device 102 may be a component (e.g., a solid-state drive (SSD)) of a network accessible data storage system, such as an enterprise data system, a network-attached storage system, a cloud data storage system, etc.

To further illustrate, the data storage device 102 may be configured to be coupled to the access device 170 as embedded memory, such as in connection with an embedded MultiMedia Card (eMMC®) (trademark of JEDEC Solid State Technology Association, Arlington, Va.) configuration, as an illustrative example. The data storage device 102 may correspond to an eMMC device. As another example, the data storage device 102 may correspond to a memory card, such as a Secure Digital (SD®) card, a microSD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). The data storage device 102 may operate in compliance with a JEDEC industry specification. For example, the data storage device 102 may operate in compliance with a JEDEC eMMC specification, a JEDEC Universal Flash Storage (UFS) specification, one or more other specifications, or a combination thereof. In yet another particular implementation, the data storage device 102 is coupled to the access device 170 indirectly, e.g., via a network. For example, the data storage device 102 may be a network-attached storage (NAS) device or a component (e.g., a solid-state drive (SSD) device) of a data center storage system, an enterprise storage system, or a storage area network.

The memory 104 of FIG. 1 may include a resistive random access memory (ReRAM), a three-dimensional (3D) memory, a flash memory (e.g., a NAND memory, a NOR memory, a single-level cell (SLC) flash memory, a multi-level cell (MLC) flash memory, a divided bit-line NOR (DINOR) memory, an AND memory, a high capacitive coupling ratio (HiCR) device, an asymmetrical contactless transistor (ACT) device, or another flash memory), an erasable programmable read-only memory (EPROM), an electrically-erasable programmable read-only memory (EEPROM), a read-only memory (ROM), a one-time programmable memory (OTP), or a combination thereof. Alternatively, or in addition, the memory 104 may include another type of memory.

The memory 104 may include a semiconductor memory device. Semiconductor memory devices include volatile memory devices, such as dynamic random access memory ("DRAM") or static random access memory ("SRAM") devices, non-volatile memory devices, such as magnetoresistive random access memory ("MRAM"), resistive random access memory ("ReRAM"), electrically erasable programmable read only memory ("EEPROM"), flash memory (which can also be considered a subset of EEPROM), ferroelectric random access memory ("FRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some implementations include a resistivity switching storage element, such as an anti-fuse, phase change material, etc., and optionally a steering element, such as a diode, etc. Further by way of non-limiting example, active semiconductor memory elements include EEPROM and flash memory device elements, which in some implementations include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a two dimensional memory structure or a three dimensional memory structure. In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate). As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of a non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor material such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Alternatively, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically used for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this disclosure is not limited to the two dimensional and three dimensional illustrative structures described but cover all relevant memory structures within the scope of the disclosure as described herein and as understood by one of skill in the art.

The illustrations of the examples described herein are intended to provide a general understanding of the various implementations. Other examples or implementations may be utilized and derived from the disclosure, such that structural and logical substitutions and changes may be made without departing from the scope of the disclosure. This disclosure is intended to cover any and all subsequent adaptations or variations of various implementations. Those of skill in the art will recognize that such modifications are within the scope of the present disclosure.

The above-disclosed subject matter is to be considered illustrative, and not restrictive, and the appended claims are intended to cover all such modifications, enhancements, and other implementations, that fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A data storage device comprising:
    a memory including a single level cell (SLC) memory portion and a multilevel cell (MLC) memory portion;
    a plurality of data latches; and
    routing circuitry coupled to the plurality of data latches and configured to:
        cause first write data, received from a controller, to be stored at a first data latch of the plurality of data latches, and
        cause the first write data to be copied from the first data latch to a first particular portion of the memory based on a first program mode command received after the first write data is stored at the first data latch, wherein the first program mode command indicates the first particular portion as one of the SLC memory portion or the MLC memory portion.

2. The data storage device of claim 1, wherein the routing circuitry is further configured to cause the first write data to be copied from the first data latch to a second particular portion of the memory based on receiving a commit command after the first write data is stored at the first data latch, wherein the second particular portion corresponds to one of the SLC memory portion or the MLC memory portion.

3. The data storage device of claim 2, wherein the second particular portion is indicated by a second program mode command that is received at the routing circuitry before the first write data is stored at the first data latch.

4. The data storage device of claim 1, wherein the routing circuitry is further configured to receive a second program mode command before the first write data is stored at the first data latch, the second program mode command indicating that the first write data is to be stored at a second particular portion of the memory, wherein the second program mode command indicates the second particular portion as one of the SLC memory portion or the MLC memory portion, and the second particular portion is different than the first particular portion.

5. The data storage device of claim 4, wherein the first particular portion is the SLC memory portion and the second particular portion is the MLC memory portion.

6. The data storage device of claim 1, wherein the routing circuitry is further configured to execute a read command after the first write data is stored at the first data latch and before the first write data is copied from the first data latch to the first particular portion of the memory.

7. The data storage device of claim 1, wherein the routing circuitry includes a processor configured to execute code of a state machine.

8. The data storage device of claim 1, wherein the routing circuitry is further configured to cause the first write data to be stored at the first data latch based on a data latch address that is received before the first write data is received.

9. The data storage device of claim 1, wherein the routing circuitry is further configured to:
cause second write data, received from the controller, to be stored at a second data latch of the plurality of data latches before the first write data is copied from the first data latch to the first particular portion of the memory, and
based on receiving the first program mode command, cause the second write data to be copied from the second data latch to the first particular portion of the memory after the first write data is copied from the first data latch to the first particular portion of the memory.

10. A data storage device comprising:
a memory including a single level cell (SLC) memory portion and a multilevel cell (MLC) memory portion;
a plurality of data latches coupled to the memory; and
routing circuitry coupled to the plurality of data latches and configured to:
receive a data latch input indicating that first write data is to be stored at a first data latch of the plurality of data latches;
cause the first write data to be stored at the first data latch based on the data latch input;
after causing the first write data to be stored at the first data latch, receive a command that designates the SLC memory portion or the MLC memory portion to store the first write data; and
cause the first write data to be copied from the first data latch to a particular portion of the memory designated by the command.

11. The data storage device of claim 10, wherein the routing circuitry is further configured to execute a read command after the first write data is stored at the first data latch and before the first write data is copied from the first data latch to the particular portion of the memory.

12. The data storage device of claim 10, wherein the routing circuitry includes a processor configured to execute code of a state machine.

13. The data storage device of claim 10, wherein the routing circuitry is further configured to cause the first write data to be stored at the first data latch based on a data latch address that is received before the first write data is received.

14. The data storage device of claim 10, wherein the routing circuitry is further configured to:
cause second write data to be stored at a second data latch of the plurality of data latches before the first write data is copied from the first data latch to the particular portion of the memory; and
based on the command, cause the second write data to be copied from the second data latch to the particular portion of the memory after the first write data is copied from the first data latch to the particular portion of the memory.

15. A method comprising:
at a data storage device including routing circuitry and a memory, the memory including a single level cell (SLC) memory portion and a multilevel cell (MLC) memory portion, performing:
storing write data at a data latch,
after the write data is stored at the data latch, receiving a first program mode command designating the SLC memory portion or the MLC memory portion to store the write data; and
copied the write data from the data latch to a particular portion of the memory designated by the first program mode command.

16. The method of claim 15, further comprising receiving the write data as part of a command sequence received from a controller coupled to the memory.

17. The method of claim 16, wherein the command sequence comprises a second program mode command that precedes the write data in the command sequence, the second program mode command designating the SLC memory portion or the MLC memory portion to store the write data, and wherein the first program mode command overrides the second program mode command.

18. The method of claim 16, wherein the command sequence comprises a data latch input mode command that precedes the write data in the command sequence, the data latch input mode command indicating that the write data is to be stored at the data latch pending receipt of the first program mode command.

19. The method of claim 15, further comprising:
receiving a read command after the write data is stored at the data latch and before the write data is copied from the data latch to the particular portion of the memory; and
executing the read command before coping the write data from the data latch to the particular portion of the memory.

20. The method of claim 15, further comprising, after the write data is stored at the data latch, receiving address data identifying a particular storage element within the particular portion, wherein the write data is copied to the particular storage element within the particular portion.

* * * * *